United States Patent [19]

Rey et al.

[11] 3,873,745

[45] Mar. 25, 1975

[54] LYOPHILISATION PROCESS IN ATMOSPHERE OF CONDENSABLE GAS

[75] Inventors: Louis Rey, St. Legier; Jean-Pierre Bouldoires, La Tour-de-Peilz; Dominique Rovero, Chailly sur Clarens, all of Switzerland

[73] Assignee: Societe d'Assistance Technique pour Produits Nestle S.A., Lausanne, Switzerland

[22] Filed: Feb. 8, 1973

[21] Appl. No.: 330,755

[30] Foreign Application Priority Data
Feb. 15, 1972   Switzerland.......................... 2164/72

[52] U.S. Cl................. 426/319, 426/312, 426/385, 426/387, 34/5, 34/92
[51] Int. Cl................................................ A23l 3/36
[58] Field of Search ........... 426/312, 319, 384, 385, 426/386, 387; 62/58; 159/DIG. 5; 34/5, 92

[56] References Cited
UNITED STATES PATENTS
3,269,025   8/1966   Dryden et al....................... 426/385
3,649,296   3/1972   Friedman............................ 426/386
3,765,904   10/1973   de Roissart et al................. 426/384

Primary Examiner—A. Louis Monacell
Assistant Examiner—Curtis P. Ribando
Attorney, Agent, or Firm—Watson Leavenworth Kelton & Taggart

[57] ABSTRACT

A process for the separation of a solvent from a substance in solution or in suspension in this solvent, or containing this solvent, comprising solidifying the solvent and then separating it from the substance by sublimation at reduced pressure in a lyophilisation chamber, in which an atmosphere is created within the chamber consisting essentially of a gaseous medium capable of existing in condensed state at a temperature above −196°C and of having at that temperature a saturated vapour pressure not exceeding 2 torrs, the medium is then condensed on a cooled surface the temperature of which is such that the saturated vapour pressure of the medium does not exceed 2 torrs, and the solvent is then separated from the substance by sublimation and is condensed on the cooled surface.

9 Claims, 1 Drawing Figure

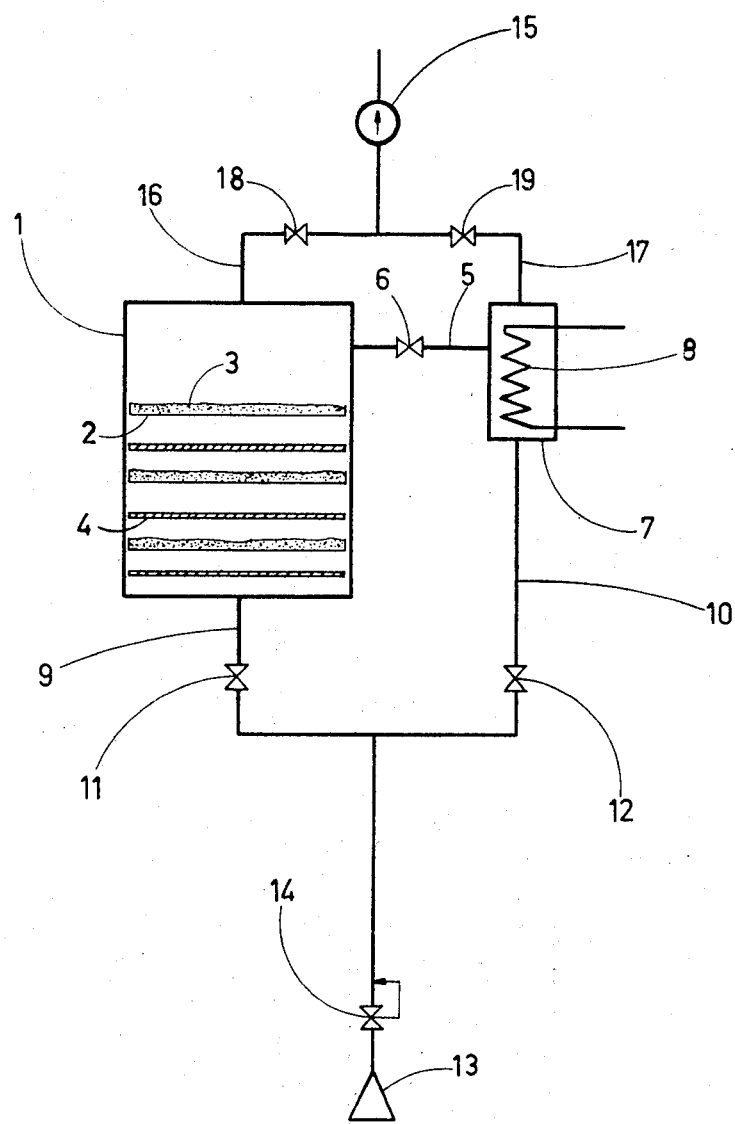

LYOPHILISATION PROCESS IN ATMOSPHERE OF CONDENSABLE GAS

The present invention is concerned with lyophilisation.

The technique of lyophilisation essentially consists of freezing a solution or suspension of a substance in a solvent and eliminating the solvent by sublimation, generally at reduced pressure. This technique may be applied to non-aqueous media, for example to solutions or suspensions of foodstuffs in organic solvents, or to aqueous media. In the latter case, lyophilisation is also called freeze-drying. In order to induce sublimation of the solvent, the frozen product is generally placed in an impervious chamber in which a reduced pressure is established and the heat energy necessary for the sublimation of the solvent is supplied to the product, the generated vapour being generally evacuated by condensation on a cooled surface known as a condenser. The conditions of this sublimation are closely related to the pressure conditions within the chamber as well as to the respective temperatures of the product to be treated and of the condenser surface. In particular, since the circulation behaviour of the vapour may be disturbed by air or residual gases which cannot be condensed on the cooled surface if the pressure in the chamber is higher than 1 torr, the pressure within the chamber at the start of the operation must be sufficiently low. On the other hand, if it is desired to carry out the lyophilisation at low temperature, for example in order to preserve particularly unstable aromatic constituents, or to avoid melting, for example when the solvent to be eliminated has a low melting point, the pressure in the chamber must be very low and requires efficient means of pumping.

The pumping equipment used in lyophilisation installations should therefore have suction rate and minimum pressure characteristics such that the pressure in the enclosure may be reduced rapidly, and to a sufficiently low level.

In practice these criteria limit the choice of pumping equipment to installations comprising rotary pumps and/or oil diffusion pumps. Thus, other types of pumping equipment, such as steam ejectors or liquid seal pumps, which may be used together with the pumps previously mentioned, cannot in general be used individually since they do not allow the desired pressure levels to be obtained in simple manner. For example, a reduced pressure of $10^{-1}$ torr, which may be easily obtained with a backing pump, requires a 6-stage steam ejector which involves a considerable consumption of water. On the other hand, the performance of liquid-seal pumps is limited by the vapour pressure of the liquid used. It is thus necessary, in order to obtain a sufficiently low pressure in the chamber to utilise a pumping device comprising a rotary pump and/or an oil diffusion pump. However, the functioning of these pumps is frequently accompanied by oil back-streaming and it is practically impossible to remove all of the oil particles, even by using liquid nitrogen traps. The oil particles which reach the lyophilisation chamber may condense on the cold surfaces of the installation, particularly on the condenser, and even on the product to be treated, resulting in contamination.

The present invention is essentially concerned with a particularly simple lyophilisation process which allows sublimation of the solvent to be effected at low pressures whilst avoiding contamination. It provides a process for separating a solvent from a substance in solution or in suspension in this solvent or containing this solvent, in particular a foodstuff or a biological material, comprising solifyfying the solvent and then separating it from the substance by sublimation at reduced pressure in a lyophilisation chamber, in which an atmosphere is created within the chamber consisting essentially of a gaseous medium capable of existing in condensed state at a temperature above $-196°C$ and of having at that temperature a saturated vapour pressure not exceeding 2 torrs, the medium is then condensed on a cooled surface the temperature of which is such that the saturated vapour pressure of the medium does not exceed 2 torrs, and the solvent is then separated from the substance by sublimation and is condensed on the cooled surface.

By the expression "atmosphere consisting essentially of a gaseous medium" is meant, in the following specification, an atmosphere obtained by replacing air initially present in the chamber by the gaseous medium, by a series of purges. Each purge may for example be effected by pumping the atmosphere from the chamber until a pressure of the order of 10 to 20 torrs is reached, with a pump that does not provoke oil back-streaming, such as a liquid-seal pump or a steam ejector, followed by injection of the gaseous medium into the chamber.

Among the gaseous media capable of existing in a condensed state at a temperature above $-196°C$ and of having at that temperature a saturated vapour pressure not exceeding 2 torrs, may be cited gases capable of existing under these conditions in solid state, such as carbon dioxide, nitrogen pentoxide, nitrogen dioxide, sulphur dioxide, ammonia, nitrous oxide, hydrogen sulphide or acetylene, as well as substances capable of existing in liquid form such as certain freons, for example, freon 11 or freon 114 B2. Of course the choice of the gaseous medium should be made having regard to the nature of the substance to be lyophilised, in particular taking into account toxicity criteria in the case of foodstuffs, or other operating parameters such as the temperature of the condenser and the pressure level desired. The medium is preferaby selected among substances which are normally gaseous at atmospheric pressure and ambient temperature. However, it is also possible to utilise normally liquid substances such as water or freon 114 B2, which first require to be vapourised by heating.

The process according to the invention is particularly useful when a very pure lyophilised product is desired, and allows the recovery from the condensate, which is uncontaminated, of various volatile substances, such as volatile aromatic constituents of foodstuffs distilled during sublimation, and which may then be returned to the lyophilised product.

The process according to the invention may also be applied with particular advantage to the preparation of aromatic extracts. Thus, a solution of aromatic constituents may be prepared from a substance such as a foodstuff, e.g. tea or coffee, by impregnating this substance with a solvent, freezing the solvent and separating the solvent from this substance by the process according to the invention. The solvent may, for example, be water. The resulting condensate, which is uncontaminated, may then be recovered, preferably in liquid state after having been warmed, and provides a solution of the aromatic constituents of the material treated. This solution may then be used as an aromatising agent. It may be sprayed on a powdered extract of the substance treated, for example at a level of 2% by weight, or it may be added to a liquid or pasty extract of this substance.

In one particular embodiment of the process according to the invention, the frozen solidified product is placed in a lyophilisation chamber and the atmosphere is evacuated from the chamber with a pumping device operating on a principle which excludes all risks of oil back-streaming into the chamber. The choice of this pumping device essentially depends upon the dimensions of the chamber. Thus, using a liquid-seal pump and starting from atmospheric pressure, a pressure of 10 to 20 torrs may be set up in a few tens of seconds in a chamber of average dimensions, for example having a capacity of about 30 litres. If the dimensions of the chamber are greater, it may be preferable to use one or more steam ejectors, for example a 2-stage ejector, eventually in series with "Roots" pumps. For small laboratory installations, simpler pumping methods such as water-jet pumps may also be used.

When the pressure inside the chamber reaches a level of the order of a few torrs, for example 10 to 30 torrs, a gas such as carbon dioxide, ammonia, or any other gaseous medium having the properties previously defined is injected into the chamber. A controlled atmosphere is thus established within the chamber at a pressure which is compatible with the mechanical strength of the apparatus as well as with preservation criteria of the product to be treated, and this pressure may be above or below atmospheric pressure. These operations of pumping and gas injection may be effected several times, for example 5 or 6 times, to obtain within the chamber an atmosphere which consists essentially of the gaseous medium injected, that is practically exempt of gaseous substances non-condensable at $-196°C$, or gaseous substances having at this temperature a saturated vapour pressure above 2 torrs, such as oxygen and nitrogen from the air.

The chamber is then isolated from the pumping device and gas source, and the gaseous medium constituting the atmosphere within the chamber is condensed on one or more condensers of which the surface is cooled to an appropriate temperature. By appropriate temperature is meant a temperature which is lower than the temperature of the monovariant system consisting of the condensed phase in equilibrium with the vapour phase of the medium, at a vapour pressure of 2 torrs.

According to a preferred variant of this embodiment, when the last purging operation of pumping and gas injection has been effected, the chamber is evacuated for the last time to a pressure of 10 to 30 torrs, the chamber is then isolated from the pumping device and the gas source, and the gaseous medium is condensed on the surface of a condenser cooled to to an appropriate temperature.

If the condenser is located in an enclosure in communication with the chamber, an atmosphere consisting essentially of the gaseous medium may be established in the enclosure by the same purging procedure. Cooling of the condenser to the appropriate temperature induces condensation of the gaseous medium and reduction of the pressure in the enclosure, and also in the chamber if communication between the chamber and condenser enclosure is established. Needless to say such an apparatus may include several condensers with provision for each to be in communication with the chamber or isolated therefrom, the connections for purging by pumping and gas injection permitting a controlled atmosphere to be established in each.

The pressure established in the chamber after condensation of the gaseous medium on the cooled surface of the condenser may be adjusted according to the temperature of the surface of this condenser. Thus, for example, if the medium chosen is carbon dioxide, a temperature of $-150°C$ corresponds to a pressure of 0.4 torr, and a temperature of $-170°C$ corresponds to $4.10^{-4}$ torr. Preferably, the condenser is maintained at a temperature below the temperature of the monovariant system consisting of the condensed medium in equilibrium with its vapour, at a saturated vapour pressure of 0.5 torr. By way of example, the temperatures corresponding to a saturated vapour pressure of 0.2 torr for certain condensed substances which may be used in the process according to the invention are as follows:

| Substance | Temperature °C | State | Saturated vapour pressure (Torr) |
| --- | --- | --- | --- |
| Nitrogen pentoxide ($N_2O_5$) | $-60$ | solid | 0.2 |
| Nitrogen dioxide ($NO_2$) | $-77$ | solid | 0.2 |
| Sulphur dioxide ($SO_2$) | $-116$ | solid | 0.2 |
| Ammonia ($NH_3$) | $-130$ | solid | 0.2 |
| Hydrogen sulphide ($H_2S$) | $-155$ | solid | 0.2 |
| Nitrous oxide ($N_2O$) | $-160$ | solid | 0.2 |
| Acetylene ($C_2H_2$) | $-160$ | solid | 0.2 |
| Freon 11 | $-100$ | liquid | 0.2 |
| Freon 114 B2 | $-90$ | liquid | 0.2 |

When a reduced pressure, chosen according to the type of product to be lyophilised and the final characteristics desired, has been established in the chamber, the heat energy necessary for the sublimation of the solvent is supplied to the frozen solidified product, and the vapours generated condense on the cooled surface of the condenser. If the apparatus comprises several condensers, it is possible, during sublimation, to connect successively different condensers with the chamber so as to assure condensation of the generated vapours.

According to a variant of this embodiment, an atmosphere consisting of the gaseous medium may be established in the impervious chamber and, if necessary, in the enclosures containing the condensers, by effecting the purge by sweeping. Thus, for example, if the gaseous medium has a higher density than air, it may be injected into the lower part of the chamber so that the air can be expelled at the upper part of the chamber. When this purge is completed, that is when the atmosphere in the enclosure consists essentially of the gaseous medium, it is condensed on the cooled surface of the condenser.

According to another variant, the solidified product may be introduced into the chamber which is under controlled atmosphere conditions, that is when the atmosphere in the chamber consists of the gaseous medium, or is already under reduced pressure. Under these conditions, the introduction of the product is effected through an air-lock in which the same atmosphere is established.

The accompanying drawing illustrates one form of apparatus suitable for carrying out the process according to the invention. The single figure of this drawing schematically represents an elevation of the apparatus.

As shown in the drawing, the apparatus comprises a lyophilisation chamber 1 containing loading trays 2 for the frozen product 3 between which are disposed heating platens 4.

The chamber 1 communicates, by way of a line 5 and a valve 6, with a chamber 7 containing a condenser 8. The lower parts of the chamber 1 and 7 are connected, in parallel, by way of lines 9 and 10 respectively equipped with valves 11 and 12, to a gas source 13 provided with a relief valve 14. On the other hand, the chambers 1 and 7 communicate, at their upper parts, with a pump 15, for example a liquid-seal pump or a steam ejector, by way of lines 16 and 17 provided respectively with valves 18 and 19.

When the loading trays 2 containing the frozen product 3 have been placed in the chamber 1, valves 6, 11 and 12 being closed and valves 18 and 19 open, the pump 15 is started. When the pressure in the chambers 1 and 7 has stabilised, to about 20 torrs, valves 18 and 19 are closed, valves 11 and 12 are opened, and a gas pressure of about one atmosphere is established in the chambers 1 and 7 by opening the relief valve 14. The pumping-injection cycle is repeated 5 or 6 more times, the atmosphere in the chambers 1 to 7 is then evacuated for the last time with the pump 15 and all of the valves are closed.

The condenser is then cooled to an appropriate temperature, that is to a temperature below the temperature of the monovariant system consisting of the condensed phase in equilibrium with the vapour phase of the gas drawn from the source 13, at a vapour pressure of 2 torrs. It is then sufficient to open the valve 6 to reduce the pressure in the chamber 1, and to heat the product through the heating platens 4.

The invention is illustrated by the following examples, in which the percentages are by weight.

EXAMPLE 1

An aqueous tea extract having a solids concentration of 3% is frozen, particulated, and loaded on the trays of a lyophilisation chamber. An atmosphere consisting essentially of carbon dioxide is established in this chamber, as well as in the enclosure containing a tubular condenser, by effecting 5 successive purges, each purge consisting of evacuating the atmosphere of these enclosures with a liquid-seal pump down to a pressure of 20 torrs, followed by establishing an atmosphere of $CO_2$ by introducing this gas at a pressure of 1 atmosphere.

After the last evacuation of the atmosphere from the two enclosures, these are isolated from the pump and $CO_2$ source, and liquid nitrogen is fed to the tubular condenser. The pressure in the enclosure containing the condenser decreases to a value of the order of $10^{-4}$ torrs. The lyophilisation chaamber is then connected to the condenser and the pressure in this chamber decreases, also reaching around $10^{-4}$ torrs.

The frozen product is then heated to induce sublimation, and this sublimation is continued for 6 hours to obtain a powdered tea extract.

EXAMPLE 2

1 kg of black tea leaves moistened with 200 g of water are loaded on the trays of a lyophilisation chamber. The trays are then covered with screens to prevent the tea leaves from being carried away by the vapour current during the treatment which follows. As described in Example 1, a reduced pressure of $10^{-4}$ torrs is established in the chamber, which causes freezing of the water with which the tea leaves are moistened.

The frozen product is then heated to induce sublimation, and the sublimation is continued for 4 hours. The condenser is then allowed to warm up, care being taken to maintain the enclosure containing the condenser under pressure with dry nitrogen to avoid condensation of atmospheric moisture, condensation which would otherwise dilute the aromatic solution, and to avoid contamination of the condensate by atmospheric dust. The condensate is recovered in liquid form to obtain 200 g of an aqueous solution of aromatic constituents of tea.

The total amount of this aqueous solution is then deposited on 10 kg of a lyophilised powdered tea extract containing 1% moisture. The extract to be aromatised is distributed by means of a device which causes the powdered particles to fall in the form of an annular curtain, and the solution is sprayed, from a nozzle situated inside the curtain, in a conical sheet which meets the curtain of powder.

An aromatised tea extract is thus obtained, having a moisture content of 3%. Beverages reconstituted from the untreated lyophilised extract and the treated extract and having the same solids contents, that is 4 g per litre of water, are submitted to a panel of 5 trained tasters. The testers unanimously showed a marked preference for the beverage reconstituted from the extract treated as described.

We claim:

1. In a process for the separation of a solvent from a substance in solution or in suspension in this solvent, or containing this solvent, comprising solidifying the solvent and then separating it from the substance by sublimation at reduced pressure in a lyophilisation chamber, the improvement which comprises creating within the chamber an atmosphere consisting essentially of a gaseous medium capable of existing in condensed state at a temperature above $-196°C$ and of having at that temperature a saturated vapour pressure not exceeding 2 torrs, condensing the medium on a cooled surface the temperature of which is such that the saturated vapour pressure of the medium does not exceed 2 torrs whereby the pressure of the medium in the chamber is reduced to not more than 2 torrs, separating the solvent from the substance by sublimation and then condensing the solvent on the cooled surface.

2. A process according to claim 1, characterised in that the gaseous medium is condensed in solid state.

3. A process according to claim 2, in which the gaseous medium is carbon dioxide, sulphur dioxide, nitrogen pentoxide, nitrogen dioxide, nitrous oxide, hydrogen sulphide, ammonia or acetylene.

4. A process according to claim 1, in which the gaseous medium is condensed in liquid state.

5. A process according to claim 4, in which the gaseous medium is a freon.

6. A process according to claim 1, in which the substance is a foodstuff and the condensate is recovered and is added to an extract of this foodstuff.

7. A process according to claim 6 in which the foodstuff is tea or coffee.

8. A process according to claim 7, in which the solvent comprises water.

9. A process according to claim 1, in which the solvent comprises water.

* * * * *

UNITED STATES PATENT OFFICE
CERTIFICATE OF CORRECTION

Patent No. 3,873,745   Dated March 25, 1975

Inventor(s) Louis Rey, Jean-Pierre Bouldoires and Dominique Rovero

It is certified that error appears in the above-identified patent and that said Letters Patent are hereby corrected as shown below:

Col. 2, line 5, "solififying" should read --solidifying--.

Col. 3, between lines 58 and 59, complete paragraph omitted which reads --If the condenser is situated within the chamber, it is sufficient, to obtain the desired pressure, to cool the condenser to the appropriate temperature.--

Col. 5, line 47 of Example 1, "3%" should read --30%--.

Col. 5, line 63 of Example 1, "chaamber" should read --chamber--.

Col. 6, line 36 of Example 2, "testers" should read --tasters--.

Signed and sealed this 27th day of May 1975.

(SEAL)
Attest:

RUTH C. MASON
Attesting Officer

C. MARSHALL DANN
Commissioner of Patents
and Trademarks